(12) United States Patent
Han

(10) Patent No.: US 12,447,931 B2
(45) Date of Patent: Oct. 21, 2025

(54) SENSOR CLEANING SYSTEM WITH ANTI-FREEZING FUNCTION

(71) Applicants: HYUNDAI MOTOR COMPANY, Seoul (KR); KIA CORPORATION, Seoul (KR)

(72) Inventor: Yu Ri Han, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 414 days.

(21) Appl. No.: 17/991,150

(22) Filed: Nov. 21, 2022

(65) Prior Publication Data

US 2023/0174024 A1  Jun. 8, 2023

(30) Foreign Application Priority Data

Dec. 2, 2021 (KR) .................. 10-2021-0171086

(51) Int. Cl.
| | |
|---|---|
| B60S 1/56 | (2006.01) |
| B60S 1/54 | (2006.01) |
| F24H 3/00 | (2022.01) |
| F24H 15/242 | (2022.01) |
| F24H 15/258 | (2022.01) |
| F24H 15/262 | (2022.01) |
| B60S 1/02 | (2006.01) |
| F16T 1/00 | (2006.01) |

(52) U.S. Cl.
CPC . B60S 1/56 (2013.01); B60S 1/54 (2013.01); F24H 3/002 (2013.01); F24H 15/242 (2022.01); F24H 15/258 (2022.01); F24H 15/262 (2022.01); B60S 1/023 (2013.01); F16T 1/00 (2013.01)

(58) Field of Classification Search
CPC .... B60S 1/56; B60S 1/54; B60S 1/023; B60S 1/60; B60S 1/487; B60S 1/52; B60S 1/548; F24H 3/002; F24H 15/242; F24H 15/258; F24H 15/262; F16T 1/00; G01S 2013/9323; G01S 7/4043; G01S 13/931; G01S 2007/4977; G01S 17/86; G01S 17/931; B60W 10/30; B60W 60/001; F04B 39/00; F04B 41/02
See application file for complete search history.

(56) References Cited

U.S. PATENT DOCUMENTS

| | | | | |
|---|---|---|---|---|
| 5,337,779 | A * | 8/1994 | Fukuhara | F16T 1/00 137/392 |
| 9,375,737 | B1* | 6/2016 | Zucker | B05B 7/1666 |
| 11,273,798 | B2 | 3/2022 | Giraud | |
| 2007/0077151 | A1* | 4/2007 | Hirasawa | F04B 49/022 417/5 |
| 2019/0106086 | A1 | 4/2019 | Giraud | |
| 2023/0166694 | A1* | 6/2023 | Kim | G01S 17/931 15/313 |

FOREIGN PATENT DOCUMENTS

KR    20180136981 A    12/2018

* cited by examiner

*Primary Examiner* — Michael C Zarroli
(74) *Attorney, Agent, or Firm* — Lempia Summerfield Katz LLC

(57) ABSTRACT

A sensor cleaning system for a vehicle implements anti-freezing and defrosting functions. The sensor cleaning system includes: an air tank configured to store compressed air; a heating element disposed in the air tank and configured to apply heat to the air tank; and a controller configured to operate the heating element when a preset condition is satisfied.

17 Claims, 12 Drawing Sheets

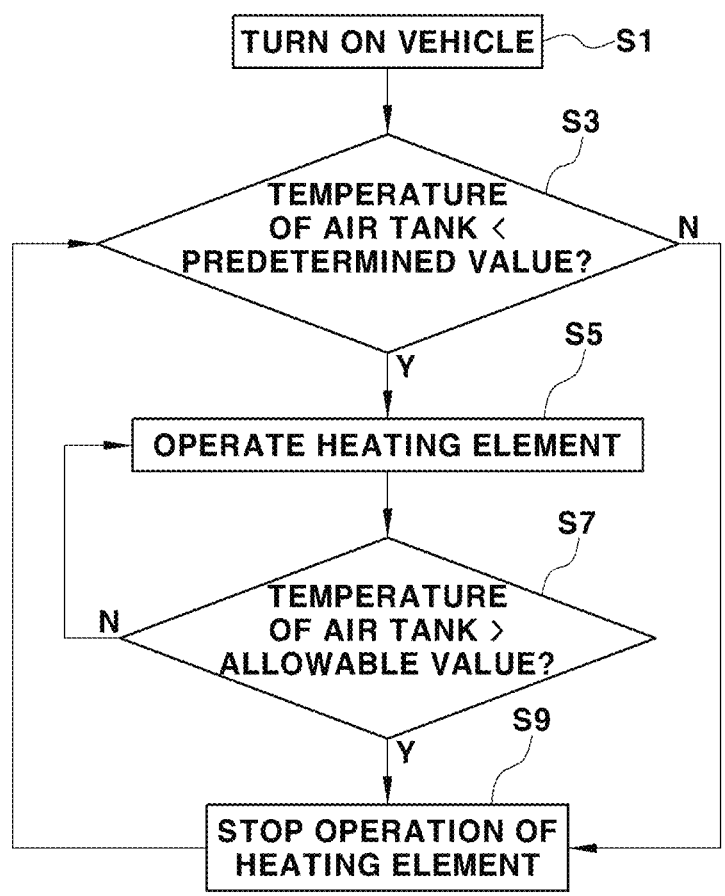

SENSOR CLEANING SYSTEM WITH ANTI-FREEZING FUNCTION

CROSS-REFERENCE TO RELATED APPLICATION

This application claims under 35 U.S.C. § 119(a) the benefit of and priority to Korean Patent Application No. 10-2021-0171086 filed on Dec. 2, 2021, the entire contents of which are incorporated herein by reference.

BACKGROUND

(a) Technical Field

The present disclosure relates to a sensor cleaning system for a vehicle and, more particularly, to a sensor cleaning system with anti-freezing and defrosting functions in an air-jet sensor cleaning system.

(b) Background Art

Recently, driver assistance systems for assisting drivers in vehicles are applied to the vehicles to ensure safe driving in various traveling situations. Further, research and development has been actively conducted on autonomous vehicles that may autonomously travel without a driver's intervention, in addition to on the driver assist systems.

The driver assistance system or the autonomous vehicle is equipped with various types of environmental sensors that may detect environments around the vehicle in various ways. Examples of the environmental sensor mounted in the vehicle may include a radar, a lidar, a camera, and the like.

Because these sensors are mounted outside the vehicle, sensing parts thereof may be easily contaminated by rainwater, snow, and foreign substances such as dust. Because the sensors need to be kept clean at a certain level to ensure sensor performance, sensor cleaning systems are mounted in the vehicles to clean the sensors when the sensing parts are contaminated.

The above information disclosed in this Background section is only to enhance understanding of the background of the present disclosure. Therefore, the Background section may contain information that does not form the prior art that is already known to a person of ordinary skill in the art.

SUMMARY OF THE DISCLOSURE

The present disclosure has been made in an effort to solve the above-described problems associated with prior art, and an object of the present disclosure is to provide a sensor cleaning system capable of preventing an operation failure of sensors, which is caused by freezing of liquid or foreign substances.

The object of the present disclosure is not limited to the above-mentioned object, and other objects, which are not mentioned above, may be clearly understood from the following descriptions by those having ordinary skill in the art (hereinafter, referred to as 'those skilled in the art') to which the present disclosure pertains.

The features of the present disclosure for achieving the above-mentioned objects of the present disclosure and carrying out the characteristic function of the present disclosure are described below.

In one aspect, the present disclosure provides a sensor cleaning system for a vehicle. The sensor cleaning system includes: an air tank configured to store compressed air; a heating element disposed in the air tank and configured to apply heat to the air tank; and a controller configured to operate the heating element when a preset condition is satisfied.

The present disclosure provides the sensor cleaning system capable of preventing an operation failure of sensors, which is caused by freezing of liquid (e.g., water, cleaning agent or the like) or foreign substances (e.g., dust).

The effects of the present disclosure are not limited to the above-mentioned effects, and the other effects, which are not mentioned above, should be clearly understood by those having ordinary skill in the art from the following description.

Other aspects and embodiments of the present disclosure are discussed below.

It should be understood that the terms "vehicle" or "vehicular" or other similar term as used herein include motor vehicles in general. Such motor vehicles may encompass passenger automobiles including sports utility vehicles (SUVs), buses, trucks, various commercial vehicles, watercraft including a variety of boats and ships, aircraft, and the like. The terms also include hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed below.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein.

Figure 1:
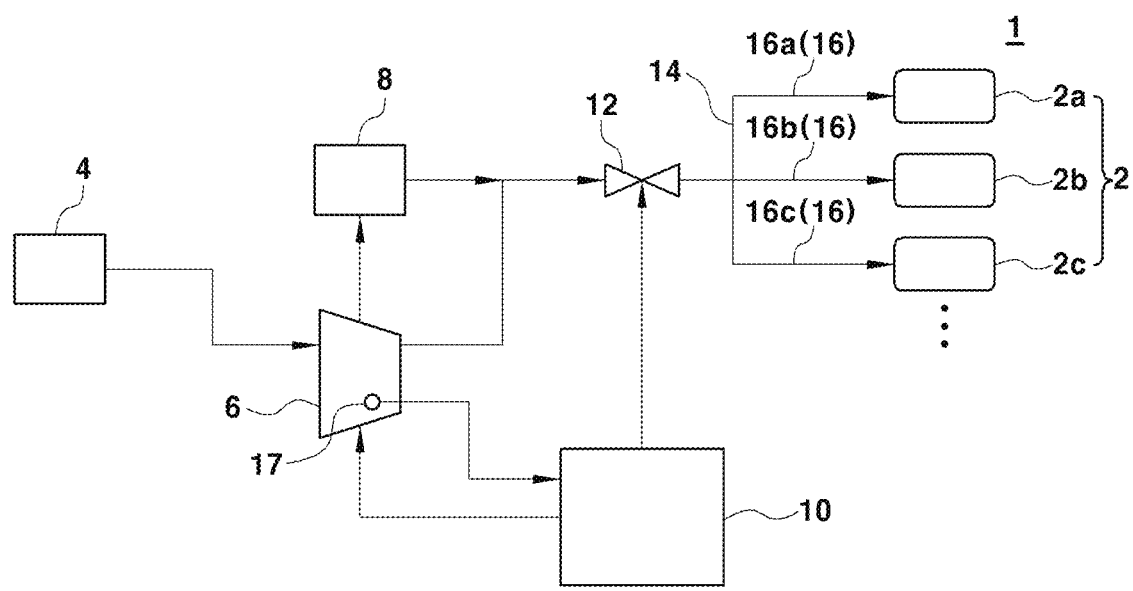
FIG. 1 is a configuration view illustrating an air cleaning system according to one embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference is now made in detail to various embodiments of the present disclosure, examples of which are illustrated in the accompanying drawings and described below. While the present disclosure is described in conjunction with various embodiments, it should be understood that present description is not intended to limit the present disclosure to those embodiments. On the contrary, the present disclosure is intended to cover not only the embodiments, but also various alternatives, modifications, equivalents and other embodiments, which may be included within the spirit and scope of the present disclosure.

Specific structural and functional descriptions disclosed in the embodiments of the present disclosure are only for the purpose of explaining the concept of the present disclosure. Thus, the embodiments according to the concept of the present disclosure may be carried out in various forms. In addition, the present disclosure should not be interpreted as being limited to the embodiments disclosed in the present specification. Instead, it should be understood that the present disclosure includes all modifications, equivalents, and alternatives included in the spirit and the technical scope of the present disclosure.

Meanwhile, the terms such as "first" and/or "second" in the present disclosure may be used to describe various constituent elements, but these constituent elements should not be limited by these terms. These terms are used only to distinguish one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, such as "between" and "just between" or "adjacent to" and "directly adjacent to", for explaining a relationship between constituent elements, should be interpreted in a similar manner.

Like reference numerals indicate like constituent elements throughout the specification. Meanwhile, the terms used in the present specification are for explaining the embodiments, not for limiting the present disclosure. Unless particularly stated otherwise in the present specification, a singular form also includes a plural form. The terms "comprise (include)" and/or "comprising (including)" used in the specification are intended to specify the presence of the mentioned constituent elements, steps, operations, and/or elements, but do not exclude presence or addition of one or more other constituent elements, steps, operations, and/or elements.

Hereinafter, the present disclosure is described in detail with reference to the accompanying drawings.

As described above, sensor surfaces of environmental sensors for detecting environments around a vehicle need to be periodically cleaned to maintain the accurate performance of the environmental sensors. For example, the environmental sensor may be contaminated by foreign substances, such as dust, sand, raindrops, snow, and the like. In particular, an autonomous vehicle travels based on surrounding environment information related to traffic lights, pedestrians, road shapes, buildings, and surrounding vehicles which are detected by the environmental sensors. When the surface of the environmental sensor is contaminated by foreign substances, the environmental sensor cannot properly detect the surrounding environment, which makes the active autonomous driving impossible. Therefore, the sensor cleaning system performs important functions of assisting the environmental sensor in clearly detecting the surrounding environment without distortion and removing contaminants on the sensor surface, thereby enabling the driving.

The environmental sensor may be cleaned by using a washer fluid, high-pressure air, or the like. When the washer fluid is used to clean the sensor, moisture on the sensor may be removed by spraying air on the sensor. When the high-pressure air is used to remove foreign substances from the sensor surface, only the high-pressure air may be injected onto the sensor surface; namely, an air cleaning method.

The air cleaning method, which is the method of using the high-pressure air that cleans the environmental sensor by spraying air, is described with reference to FIG. 1. An air cleaning system 1 of the sensor cleaning system is configured to clean the environmental sensor by using compressed air. The air cleaning system 1 cleans surfaces of environmental sensors 2 by spraying the compressed air. The environmental sensors 2 include sensing devices, such as a lidar, a radar, a camera, and the like for the vehicle. The environmental sensor 2 may be disposed on a front portion, a rear portion, a lateral portion, a roof, and the like, of the vehicle.

In one embodiment, air may be filtered by an air filter 4 disposed in the vehicle and the filtered air is introduced into a compressor 6. Then, the air is compressed by the compressor 6, and the compressed air is sprayed or injected onto a surface of the environmental sensor 2, thereby removing foreign substances from the surface of the environmental sensor 2. The environmental sensors 2 may include a plurality of environmental sensors 2a, 2b, and 2c. Three environmental sensors are illustrated and described in the drawings and specification, but the present disclosure is not limited to the number of environmental sensors, and the number of environmental sensors may be increased or decreased.

In addition, the air cleaning system 1 includes an air tank 8. The air tank 8 may be filled with air compressed by the compressor 6 or air supplied from an external device. The air stored in the air tank 8 may be used to clean the environmental sensors 2a, 2b, and 2c.

In one embodiment, the air cleaning system 1 includes a controller 10 configured to operate a valve 12 (e.g., a solenoid valve) for each preset period or in a preset situation in which the contamination of anyone of the environmental sensors 2 (e.g., 2a, 2b, or 2c) is detected. Therefore, the controller 10 sprays the compressed air to the respective environmental sensor(s) 2 from the compressor 6 or the air tank 8, thereby cleaning the contaminated environmental sensor(s) 2. In another embodiment, a distributor 14 may be provided on or integrated with the valve 12 and distribute the compressed air through nozzles 16, including nozzle 16a, 16b, and 16c, respectively provided for the respective environmental sensors 2 (i.e., 2a, 2b, and 2c).

The compressor 6 has a temperature detecting unit 17. Information on a temperature of the compressor 6, which is detected by the temperature detecting unit 17, is transmitted to the controller 10 of the air cleaning system 1. The controller 10 is configured to monitor the temperature of the compressor 130 to prevent the compressor 6 from operating in a state in which a temperature thereof exceeds an operating limit temperature. When the temperature of the compressor 6 reaches the operating limit temperature, the controller 10 may control the compressor 6 to stop the operation of the compressor 6 until the temperature of the compressor 6 decreases.

Figure 2:
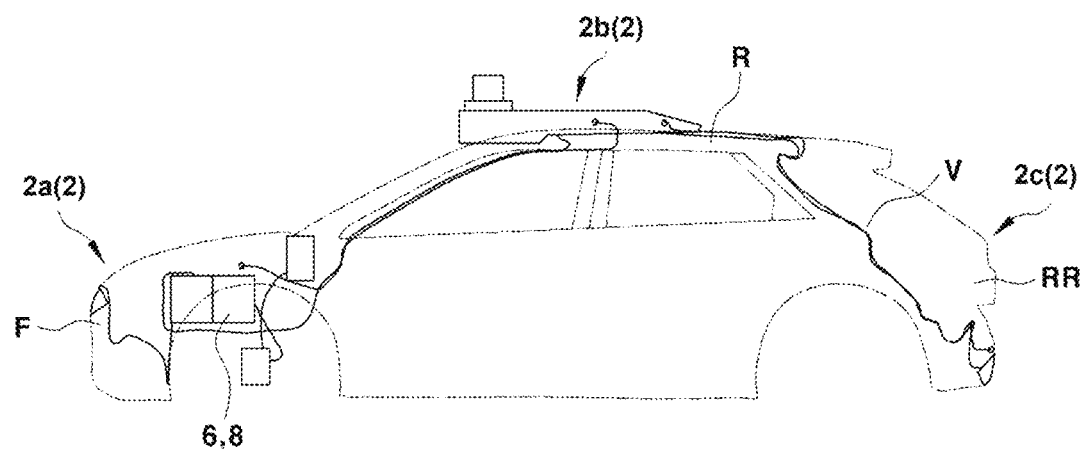
FIG. 2 is a schematic arrangement view illustrating an air cleaning system for a vehicle in one embodiment.

Referring to FIG. 2, the compressor 6 and the air tank 8 may be typically disposed at a front side of the vehicle. The air needs to be supplied from the compressor 6 and the air tank 8 disposed at the front side of the vehicle to the environmental sensors 2a, 2b, and 2c. The environmental sensors 2a, 2b, and 2c may be respectively disposed on a front portion F, a lateral portion, a roof R, a rear portion RR, and the like, of the vehicle. In one embodiment, the air stored in the air tank 8 at a high pressure passes through a hose having a small diameter and a very long length, which causes a rapid pressure drop in the air tank 8 and the distributor 14. Because of the rapid pressure drop, the air easily reaches at a dew point at which water molecules in the moist air may be liquefied or frozen.

Furthermore, the hose may be clogged by the water condensed and frozen on an inner surface of the hose, and an end of the nozzle 16 may be clogged by the frozen water droplets. In addition, an inner surface of the air tank 8 and an inner surface of the distributor 14 may be clogged because of rapid sublimation of air and frozen moisture at a pressure drop point. In this situation, the environmental sensor cannot be cleaned, and thus the environmental sensor is contaminated, which makes the autonomous driving difficult and causes an accident in a severe case.

In particular, if the components, such as the nozzle and the hose, are clogged by the frozen water, the autonomous failure diagnosis and fail-safe functions cannot be performed, which immediately stops the system and makes the autonomous driving impossible. In addition, the air tank is sometimes made of aluminum for reduced weight and improved high-pressure resistance. In this case, during a process of spraying air, a temperature of the air tank is lowered because of a rapid pressure drop, and a surface temperature of the air tank becomes very low, such that the air tank becomes vulnerable to freezing.

Accordingly, the present disclosure is intended to provide the air cleaning system with anti-freezing and frozen water removing functions. The present disclosure is intended to solve the problem of freezing due to the rapid pressure drop, thereby preventing the hose and the nozzle from being clogged by frozen water, and thus preventing an accident that may occur while the vehicle travels, particularly, autonomously travels.

Figure 3:
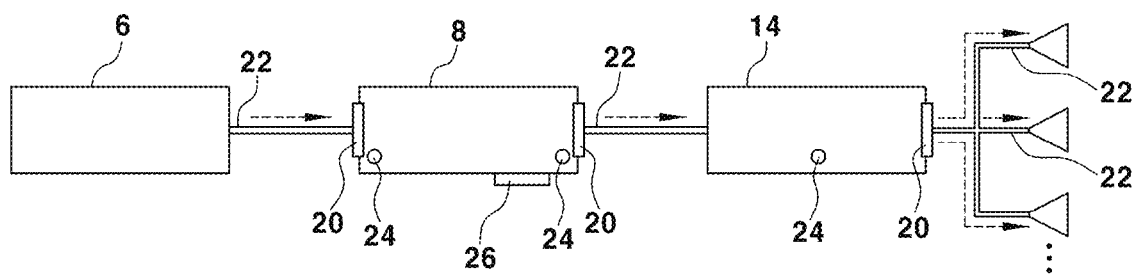
FIG. 3 is a view schematically illustrating a sensor cleaning system according to one embodiment of the present disclosure.
Figure 4:
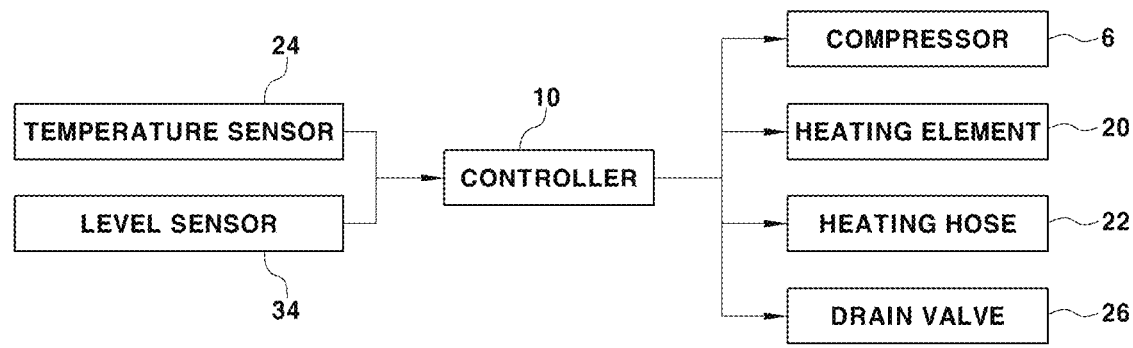
FIG. 4 is a configuration view illustrating a sensor cleaning system with an anti-freezing function according to one embodiment of the present disclosure.
Figure 5:
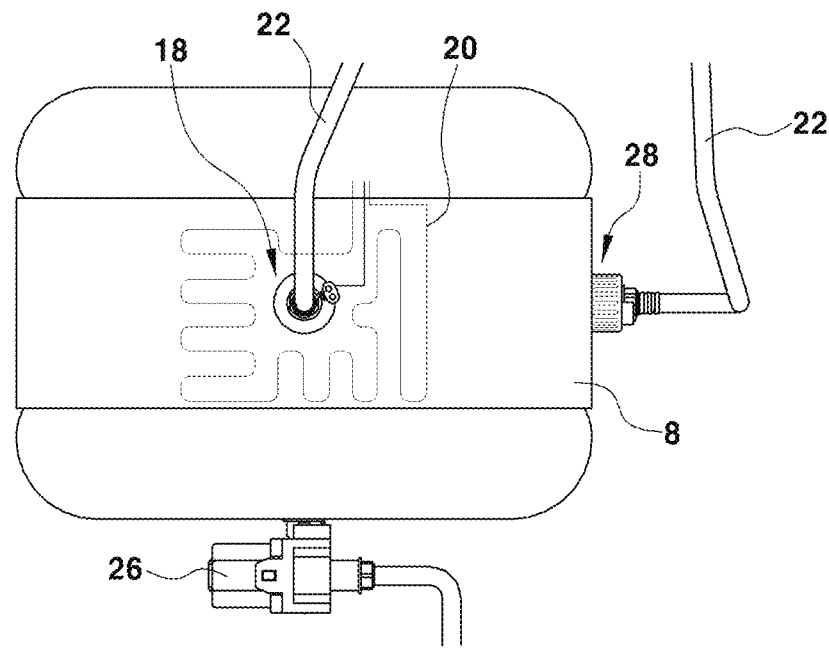
FIG. 5 is a view illustrating an air tank according to an embodiment of the present disclosure.

As illustrated in FIGS. 3 and 4, the air cleaning system 1 according to the present disclosure includes a heating element 20. In one embodiment, the heating element 20 is disposed in the air tank 8. Referring to FIG. 5, in one embodiment, the heating elements 20 may be respectively disposed around an inlet port 18 and a discharge port 28 of the air tank 8. The heating element 20 may generate heat by received voltage, thereby preventing frost and frozen water in the air tank 8, particularly, the inlet port 18 and the discharge port 28 of the air tank 8.

As a non-restrictive example, the heating element 20 may be a heat pad. In one embodiment, a sheath of the heat pad may be made of non-woven fabric, and a nichrome wire may be applied as a heating wire of the heat pad. In addition, the present disclosure is not limited to the materials, and other well-known materials may be used. However, a material with sufficient vibration resistance and heat resistance is selected. According to the present disclosure, the heating element 20 may have various shapes. As one non-restrictive example, the heating element 20 may be a wire heating element. The wire heating element is a heating element having a serial structure using a nickel or iron-chromium wire. As another non-restrictive example, the heating element 20 may be a planar heating element. In some embodiments, the planar heating element may be an ITO (indium tin oxide) film, a metal mesh film, a transparent planar heating element film, a PTC (positive temperature coefficient) heating film, a far-infrared heating film, or the like. However, the present disclosure is not limited to the materials, and applicable well-known heating elements may be used.

Referring back to FIG. 3, the air cleaning system 1 may further include a heating hose 22. An air passageway in the air cleaning system 1 may be defined by the heating hose 22. Like the heating element 20, the heating hose 22 may be operated by applied voltage. Because an air hose typically has a very small diameter and a long length, the air hose is easily frozen by a very low outside air temperature and a rapid pressure drop generated when high-pressure air is discharged into an atmospheric pressure. According to the present disclosure, the air passageway may be defined by the heating hose 22, thereby increasing the air temperature and preventing the freezing while air flows.

Referring back to FIG. 5, a drain valve 26 may be disposed in the air tank 8. The drain valve 26 may drain water produced in the air tank 8 by the operation of the heating element 20. In one embodiment, the drain valve 26 is a solenoid valve.

Referring back to FIG. 4, according to one embodiment of the present disclosure, a level sensor 34 may be disposed in the air tank 8. The level sensor 34 is configured to detect a level of water produced in the air tank 8. Information on the level of water may be a criterion in determining whether the drain valve 26 is opened. As a non-restrictive example, the level sensor may be, but not limited to, a float switch, a non-contact ultrasonic level sensor, a contact ultrasonic level sensor, a capacitance level sensor, a radar level sensor, a paddle flow rate switch, or the like.

Figure 6:
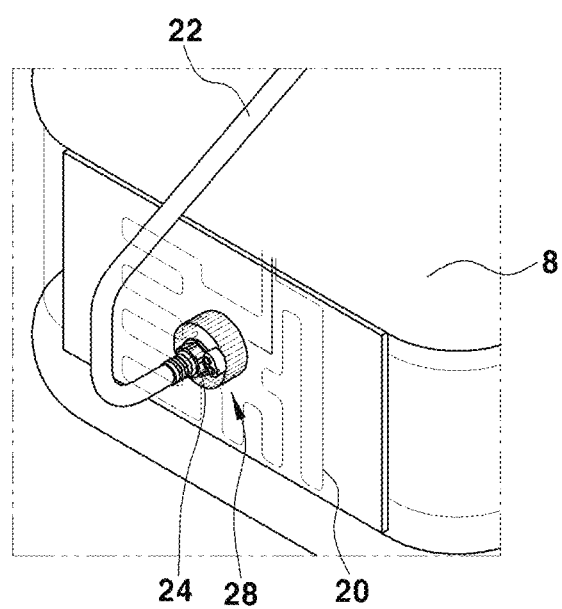
FIG. 6 is a partially enlarged view of FIG. 5.

Referring to FIG. 6, a temperature sensor 24 is disposed in the air tank 8. The temperature sensors 24 may be disposed respectively around the inlet port 18 and the discharge port 28. In particular, the temperature sensor 24 may be configured to measure information on the temperature of the surface of the air tank 8. The measured value of the temperature sensor 24 may be a criterion in determining whether the heating element 20 and the heating hose 22 operate.

The controller 10 receives information on the temperature measured by the temperature sensor 24. Further, the controller 10 is configured to operate the heating element 20 and the heating hose 22 on the basis of the measured temperature. When the controller 10 determines that the heating is required and then applies voltage, the heating element 20 and the heating hose 22 generate heat by means of physical properties of the heating wire.

In addition, the controller 10 may operate the drain valve 26 when a preset condition is satisfied. If the drain valve 26 is a solenoid valve, the controller 10 opens the drain valve 26 by applying voltage to a solenoid coil of the drain valve 26 when opening the drain valve 26. For example, the controller 10 may determine whether to open the drain valve 26 depending on vehicle states in which an autonomous driving mode of the vehicle is turned off or the vehicle is turned off. In addition, the controller 10 may open the drain valve 26 on the basis of the level of water in the air tank 8 which is measured by the level sensor 34.

A method of controlling the air cleaning system with the anti-freezing function according to the present disclosure will be described with reference to FIGS. 7A to 11.

As illustrated in FIG. 7A, the controller 10 receives information indicating that the vehicle is turned on (S1). When the vehicle is turned on, the temperature sensor 24 consistently detects a temperature of the air tank 8, and the controller 10 receives the temperature of the air tank 8 from the temperature sensor 24. Further, the controller 10 determines whether the received temperature of the air tank 8 is less than a predetermined value (S3). The predetermined value may be 0° C. (Celsius) but may vary depending on the situations. When it is determined that the temperature of the air tank 8 is less than the predetermined value, the controller 10 operates the heating element 20 (S5). In this case, the operation of the heating element 20 also means the operation of the heating hose 22. For ease of description, the operation of the heating element 20 will also mean the operation of the heating hose 22 below. Therefore, the operations of the heating element 20 and the heating hose 22 may increase the temperature of the surface of the air tank 8 and perform the anti-freezing or defrosting function. During the process of operating the heating element 20, the controller 10 consistently receives temperature information from the temperature sensor 24 to determine whether the temperature of the air tank 8 reaches a preset allowable value (S7). When the temperature of the air tank 8 is more than the allowable value, the controller 10 stops the operation of the heating element 20 by stopping applying the voltage to the heating element 20 (S9). As a non-restrictive example, the allowable value may be 10° C. However, the allowable value may be changed according to use.

Figure 7B:
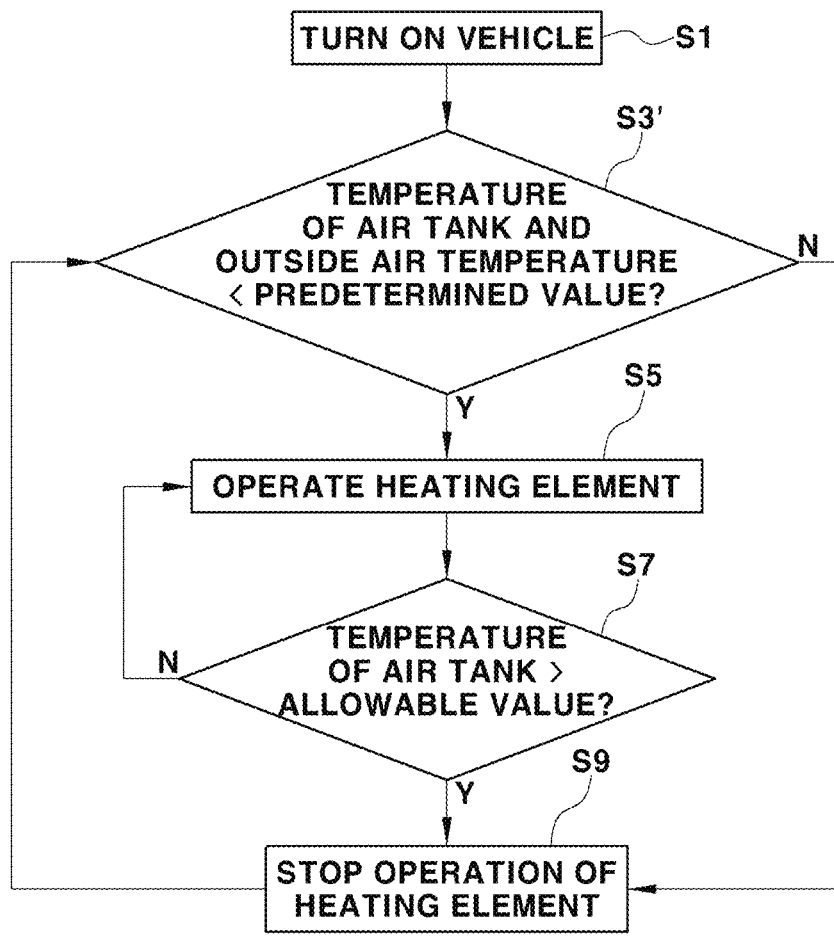
FIGS. 7A to 11 are flowcharts for explaining methods of controlling the sensor cleaning system according to various embodiments of the present disclosure.
Figure 7C:
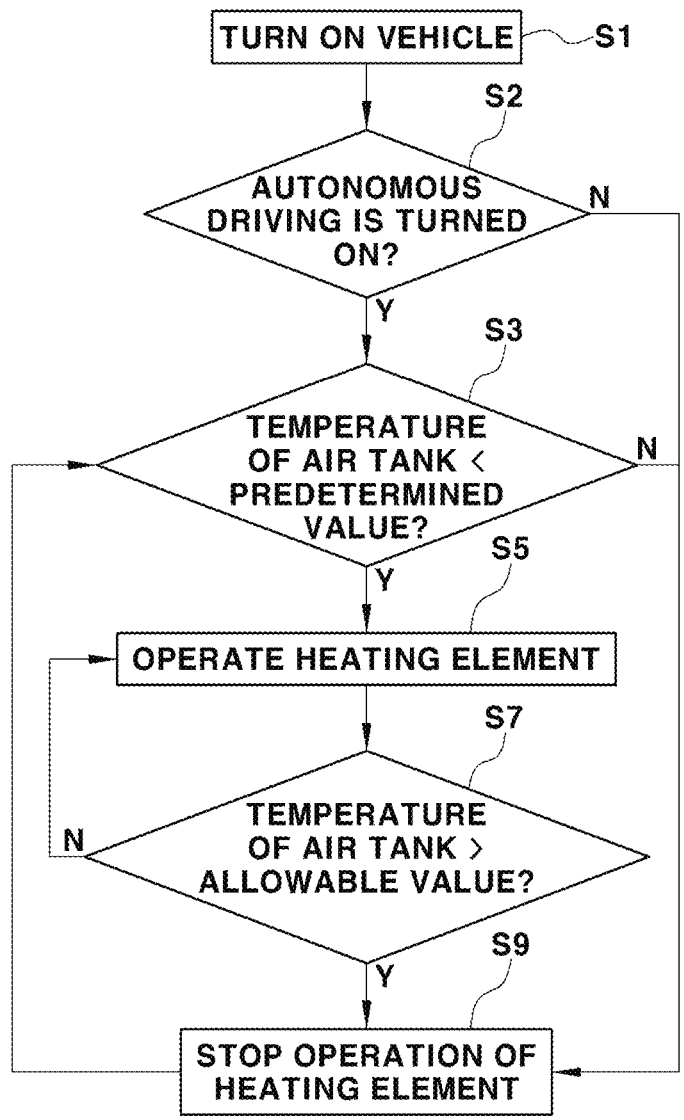

According to the present disclosure, the criterion in determining whether to operate the heating element 20 may be changed to reduce the electric power consumption and improve the durability of the system. As illustrated in FIG. 7B, according to one embodiment, the controller 10 may also use the information on the outside air temperature as a criterion in determining whether to operate the heating element 20 (S3'). When the temperature of the air tank 8 and the outside air temperature are less than a predetermined value, the controller 10 may operate the heating element 20. In addition, as illustrated in FIG. 7C, according to one embodiment of the present disclosure, the controller 10 may use whether the autonomous driving function of the vehicle is turned off as a criterion in determining whether to operate the heating element 20. The controller 10 determines whether the autonomous driving mode is turned on in order to operate the heating element 20 only when the autonomous driving mode, which essentially requires sensor cleaning, is turned on (S2). Further, the controller 10 may determine whether to operate the heating element 20 on the basis of the temperature of the air tank 8. The following steps are identical to the steps described with reference to FIG. 7A, a repeated description thereof will be omitted.

Figure 8:
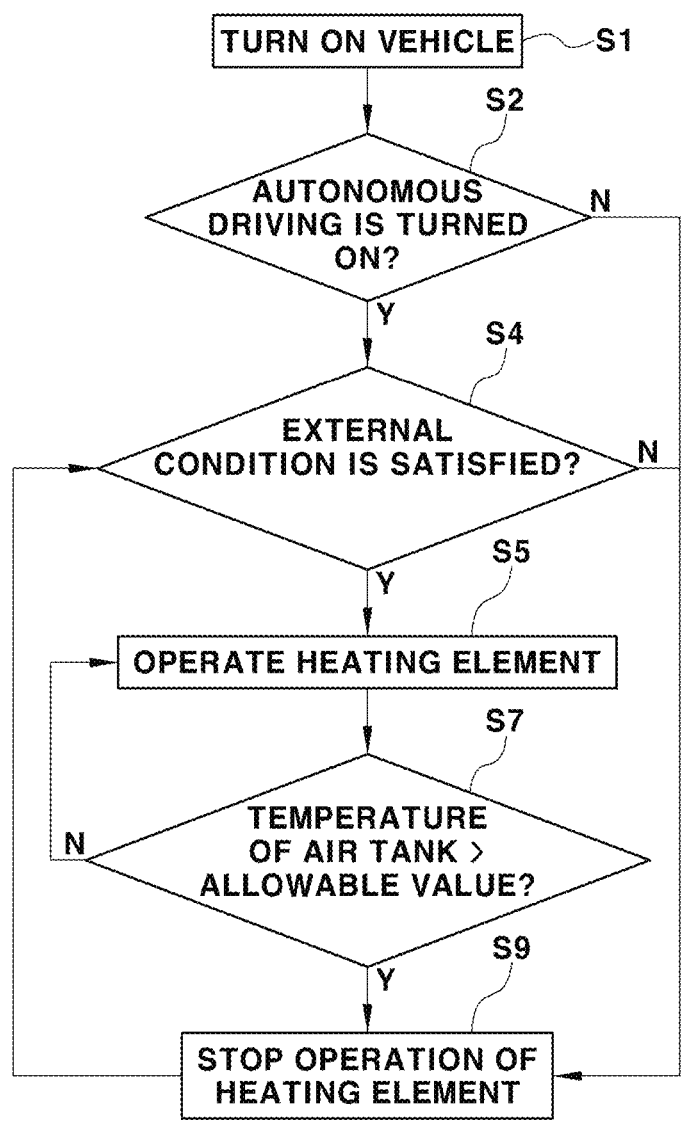

As illustrated in FIG. 8, according to one embodiment of the present disclosure, the controller 10 may determine whether to operate the heating element 20 based on external conditions, i.e., operating situations of other systems in the vehicle without determining whether the temperature of the air tank 8 measured by the temperature sensor 24 is less than the allowable value (S4). For example, the controller 10 may determine whether to operate the heating element 20 based on a signal when another controller in the vehicle operates a particular defrosting system to prevent a breakdown due to freezing. To this end, the controller 10 may be configured to communicate with a controller of another system in the vehicle that performs the defrosting operation.

Figure 9A:
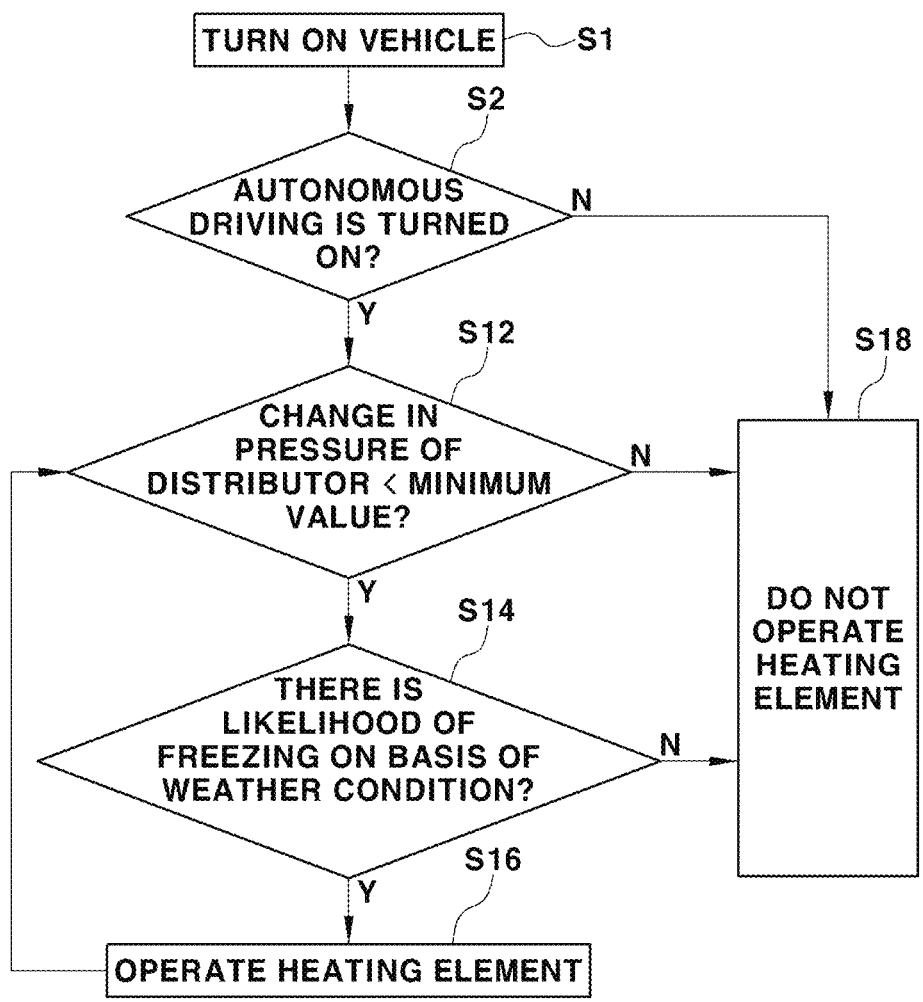

According to one embodiment of the present disclosure, the air cleaning system 1 may determine a breakdown of the air cleaning system 1, which is caused by the freezing, and solve the breakdown. As illustrated in FIG. 9A, when the vehicle is turned on (S1), the controller 10 determines whether the autonomous driving mode is turned on (S2). When the autonomous driving mode is turned on and the controller 10 opens the valve 12 to clean the sensor, the controller 10 observes a change in pressure of the distributor 14. The controller 10 determines whether the change in pressure of the distributor 14 is less than a preset minimum value (S12). The clogging caused by freezing may be determined if the pressure of the distributor 14 is not changed even in a case in which the command to open the valve 12 is issued. In this case, the controller 10 determines that the clogging occurs because of freezing, and then performs the defrosting operation by operating the heating element 20.

Additionally, the controller 10 may also determine a likelihood of freezing based on a weather condition (S14). For example, the controller 10 receives information on the amount of rainfall and information on the outside air temperature. When there is no amount of rainfall and the outside air temperature is below zero, the controller 10 may determine the clogging caused by freezing with higher probability. That is, the controller 10 may operate the heating element 20 even in a case in which the change in pressure of the distributor 14 is less than a minimum value and there is the likelihood of freezing based on the weather condition even when the command to open the valve 12 is issued (S16).

Figure 9B:
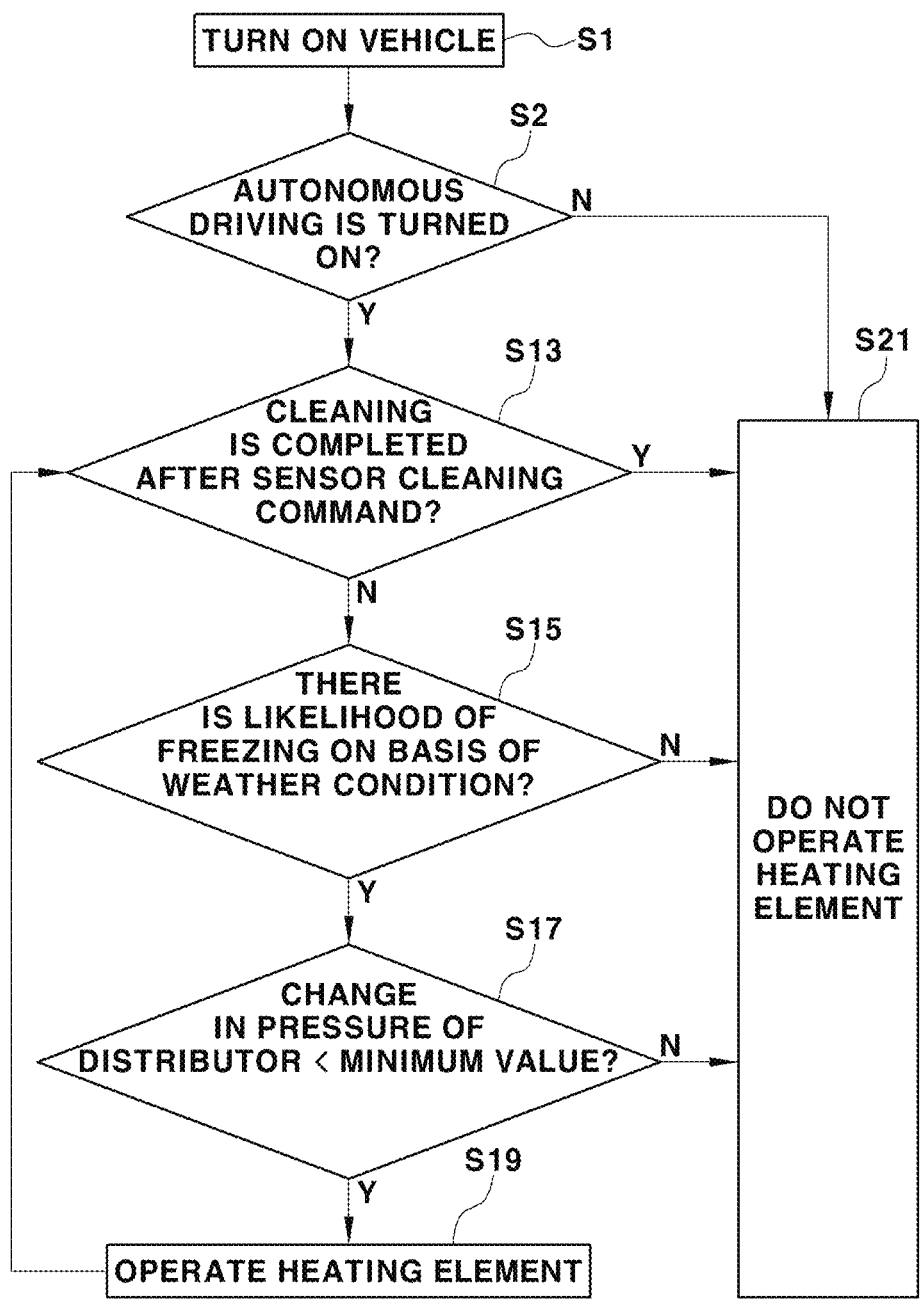

As illustrated in FIG. 9B, according to one embodiment of the present disclosure, the controller 10 may use information from another controller as a criterion in determining whether the freezing occurs. In the state in which the autonomous driving mode is turned on (S2), the controller 10 receives information, which indicates that the attempt to clean the sensor fails, from an autonomous driving controller of an autonomous driving system (S13). For example, this situation may mean that the sensor is not cleaned because of the clogging caused by freezing even when the cleaning command is inputted to the controller 10 of the sensor cleaning system from the autonomous driving controller. The autonomous driving controller may notify the controller 10 that the cleaning has failed even though the command to clean the sensor is issued several times. Further, based on the information, the controller 10 may determine whether the freezing occurs in the air cleaning system 1. Additionally, the controller 10 may operate the heating element 20 (S19) to solve the freezing problem when there is a likelihood of freezing based on the weather condition (there is no amount of rainfall and the outside air temperature is below zero) (S15) and the change in pressure of the distributor 14 is less than the minimum value (S17).

Figure 10A:
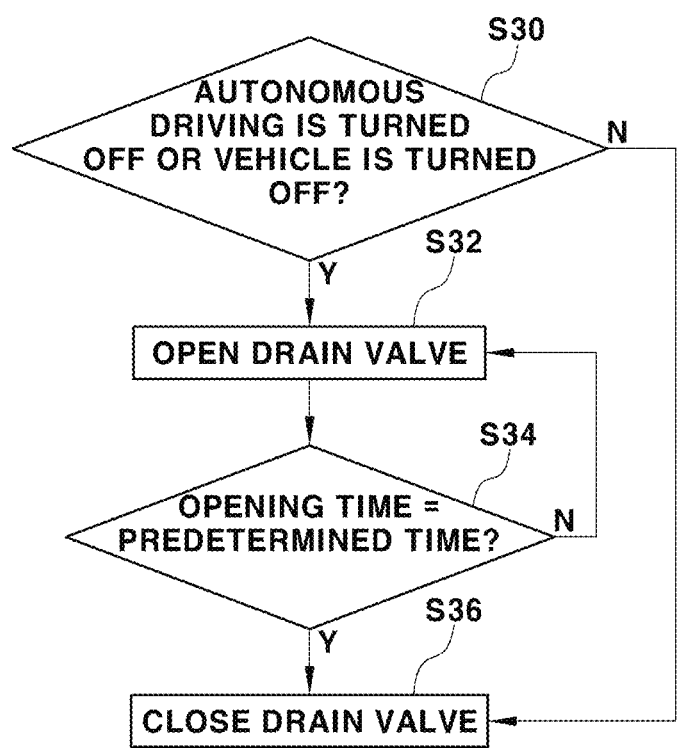
Figure 10B:
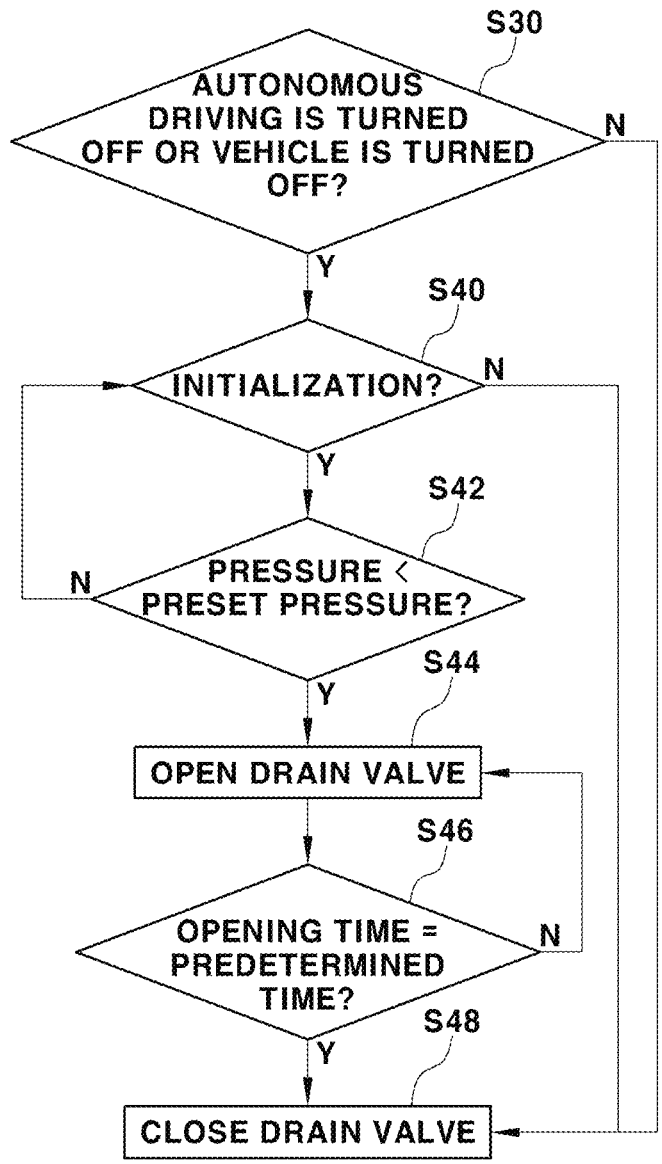
Figure 11:
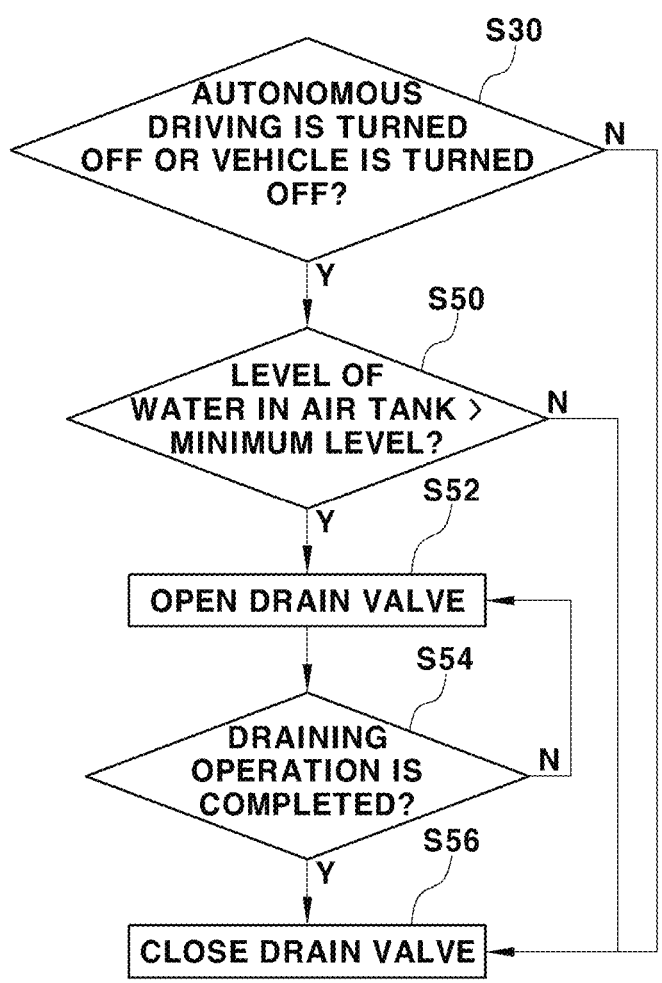

As illustrated in FIGS. 10A, 10B and 11, the controller 10 may determine whether to operate the drain valve 26 based on a preset condition.

Referring to FIG. 10A, according to one embodiment of the present disclosure, the controller 10 may open the drain valve 26 in the state in which the autonomous driving mode is turned off or the state in which the vehicle is turned off (S30). When the autonomous driving mode is turned off or the vehicle is turned off, the controller 10 opens the drain valve 26 (S32). The controller 10 determines whether an opening time for which the drain valve 26 is opened reaches a predetermined time (S34). The predetermined time may be a previously selected value of time for which the drain may be completed. When the opening time reaches the predetermined time, the controller 10 closes the drain valve 26 (S36).

As illustrated in FIG. 10B, according to one embodiment of the present disclosure, the air cleaning system equipped with an initialization function may operate the drain valve 26 depending on whether the initialization is performed. The initialization function refers to a process of regenerating a drier, which is a constituent element of the compressor 6 and configured to adsorb moisture contained in outside air at the time of compressing the outside air. When the cleaning function is not performed, the compressor 6 operates in the reverse direction to discharge air from the air tank 8. In the system having the initialization function as described above, the controller 10 receives information indicating whether the initialization function is activated (S40). During the process of performing the initialization, the controller 10 determines whether a pressure in the air tank 8 reaches a preset pressure, e.g., a pressure less than 1 bar (S42). In one embodiment, the pressure in the air tank 8 may be determined on the basis of a value measured by a pressure sensor disposed in the air tank 8. The controller may determine that the initialization is completed when the pressure reaches the preset pressure. Further, when the pressure in the air tank 8 is less than the preset pressure, the controller 10 opens the drain valve 26 (S44) and maintains the opened state of the drain valve 26 for a predetermined time (S46). When the predetermined time is elapsed, the controller 10 closes the drain valve 26 and ends the draining operation (S48). In the present embodiment, the air may be discharged from the air tank 8 and then the draining operation may be performed for a predetermined time during the initialization process.

According to one embodiment of the present disclosure, the drain valve 26 may be opened on the basis of the input of the level sensor 34. Referring to FIG. 11, the controller 10 receives the information on the level of water in the air tank 8 measured by the level sensor 34. When the autonomous driving mode is turned off or the vehicle is turned off (S30), the controller 10 determines whether the inputted level of water in the air tank 8 exceeds a preset minimum level (S50). For example, the minimum level may be 5% of a height of the air tank 8. When the inputted level of water in the air tank 8 exceeds the minimum level, the controller 10 opens the drain valve 26 (S52). The controller 10 determines whether the draining operation is completed (S54) and closes the drain valve 26 when the draining operation is completed (S56). As an example, it may be determined that the draining operation is completed when the level of water in the air tank 8 inputted from the level sensor 34 is 0.

According to the present disclosure, it is possible to prevent a breakdown of the air cleaning system.

The air cleaning system according to the present disclosure may be implemented by using control logic and adding and changing some constituent components without greatly changing the package.

When the breakdown occurred because of the freezing, the air cleaning system according to the present disclosure may diagnose the breakdown and solve the freezing problem.

The present disclosure, which has been described above, is not limited by the aforementioned embodiment and the accompanying drawings, and it should be obvious to those having ordinary skill in the art to which the present disclosure pertains that various substitutions, modifications and alterations may be made without departing from the technical spirit of the present disclosure.

The present disclosure has been described in detail with reference to the embodiments thereof. However, it should be appreciated by those having ordinary skill in the art that changes may be made to these embodiments without departing from the principles and spirit of the present disclosure.

What is claimed is:

1. A sensor cleaning system for a vehicle, the sensor cleaning system comprising:
    an air tank configured to store compressed air;
    a heating element disposed in the air tank and configured to apply heat to the air tank;
    a heating hose connected to the air tank such that the compressed air flows through the heating hose, wherein the heating hose is configured to generate heat; and
    a controller configured to operate the heating element based on a preset condition.

2. The sensor cleaning system of claim 1, further comprising:
    a temperature sensor disposed in the air tank and configured to measure a temperature of the air tank and transmit the measured temperature to the controller.

3. The sensor cleaning system of claim 2, wherein the controller is configured to operate the heating element based on the temperature of the air tank received from the temperature sensor.

4. The sensor cleaning system of claim 2, further comprising:
    a drain valve disposed on the air tank and configured to drain a fluid stored in the air tank.

5. The sensor cleaning system of claim 4, wherein the controller is configured to control an operation of the drain valve.

6. The sensor cleaning system of claim 5, further comprising:
    a level sensor configured to detect a level of water in the air tank and transmit the detected level of water to the controller.

7. The sensor cleaning system of claim 1, comprising:
    a compressor configured to produce the compressed air and connected to an inlet of the air tank; and
    a distributor connected to an outlet of the air tank and configured to receive the compressed air from the air tank and distribute the compressed air.

8. The sensor cleaning system of claim 7, wherein the heating hose comprises a first heating hose and a second heating hose, wherein the compressor and the air tank are connected by the first heating hose, and the air tank and the distributor are connected by the second heating hose.

9. The sensor cleaning system of claim 1, wherein the controller is configured to control an operation of the heating hose.

10. The sensor cleaning system of claim 7, wherein the controller is configured to control an operation of a valve configured to allow or block a distribution flow by the distributor.

11. The sensor cleaning system of claim 10, wherein the controller is configured to operate the heating element based on a determination that a change in pressure of the distributor is less than a preset minimum value when the valve is opened.

12. The sensor cleaning system of claim 8, wherein the controller is configured to operate the heating element based on a determination that an outside air temperature and an amount of rainfall satisfy preset conditions during operation of the heating element.

13. A method of controlling a sensor cleaning system for a vehicle, where the sensor cleaning system includes an air tank to store compressed air, a heating element to provide heat to the air tank, and a controller to operate the heating element, the method comprising:

receiving, by the controller, a temperature of the air tank from a temperature sensor; and operating, by the controller, the heating element based on determining that the temperature of the air tank satisfies a predetermined value and an outside air temperature satisfies a predetermined outside temperature.

14. The method of claim 13, further comprising:

determining, by the controller, whether an autonomous driving mode of the vehicle is turned off or whether the vehicle is turned off;

determining, by the controller, whether a level of water detected by a level sensor exceeds a predetermined minimum level based on determining that the autonomous driving mode of the vehicle is turned off or the vehicle is turned off; and opening, by the controller, a drain valve based on determining that the level of water in the air tank exceeds the predetermined minimum level.

15. The method of claim 13, further comprising:

continuously receiving, by the controller, the temperature of the air tank from the temperature sensor after the heating element operated; and stopping, by the controller, the operation of the heating element based on determining that the temperature of the air tank exceeds the predetermined value.

16. The method of claim 13, further comprising:

determining, by the controller, whether an autonomous driving mode of the vehicle is turned on; and operating the heating element based on determining that the autonomous driving mode of the vehicle is turned on and the temperature of the air tank received from the temperature sensor is less than the predetermined value.

17. A method of controlling a sensor cleaning system for a vehicle, where the sensor cleaning system includes an air tank to store compressed air, a heating element to provide heat to the air tank, and a controller to operate the heating element, the method comprising:

receiving, by the controller, a temperature of the air tank from a temperature sensor;

operating, by the controller, the heating element based on determining that the temperature of the air tank satisfies a predetermined value;

determining, by the controller, whether an autonomous driving mode of the vehicle is turned off or whether the vehicle is turned off; and opening, by the controller, a drain valve for a preset time based on determining that the autonomous driving mode of the vehicle is turned off or the vehicle is turned off.

* * * * *